United States Patent [19]

Fock et al.

[11] Patent Number: 4,927,961

[45] Date of Patent: May 22, 1990

[54] POLYOXYALKYLENE ETHER HAVING HYDROXYL AND SULFONATE GROUPS AND THEIR USE IN THE PREPARATION OF DISPERSABLE POLYURETHANES

[75] Inventors: Jürgen Fock, Dusseldorf; Dietmar Schedlitzki, Essen, both of Fed. Rep. of Germany

[73] Assignee: Th. Goldschmidt AG, Essen, Fed. Rep. of Germany

[21] Appl. No.: 414,659

[22] Filed: Sep. 29, 1989

Related U.S. Application Data

[63] Continuation-in-part of Ser. No. 99,477, Sep. 22, 1987, Pat. No.

[30] Foreign Application Priority Data

Oct. 1, 1986 [DE] Fed. Rep. of Germany ....... 3633421

[51] Int. Cl.$^5$ ............................................ C07C 143/11
[52] U.S. Cl. .................... 562/103; 568/616; 568/619; 568/620; 524/591; 524/840
[58] Field of Search .......................................... 562/103

[56] References Cited

U.S. PATENT DOCUMENTS

| | | | |
|---|---|---|---|
| 3,337,615 | 8/1967 | Roberts | 260/513 R |
| 4,056,564 | 1/1977 | Wolf | 260/513 R |
| 4,436,672 | 3/1984 | Naylor | 260/513 R |
| 4,594,200 | 6/1986 | Penny | 260/513 R |
| 4,612,142 | 9/1986 | Piörr | 260/513 R |
| 4,618,457 | 10/1986 | Esselborn | 260/513 R |

FOREIGN PATENT DOCUMENTS 2169894 7/1986 United Kingdom ............ 260/513 R Primary Examiner—C. Warren Ivy
Attorney, Agent, or Firm—Toren, McGeady & Associates

[57] ABSTRACT

Polyoxylalkylene ether with an average molecular weight of 400 to 10,000 with at least one terminal hydroxyl group and at least one lateral —SO$_3$X group (X=hydrogen, alkali metal or ammonium ion) is disclosed. The polyoxyalkylene ether is obtainable by The statistical or blockwise addition reaction of (a) α-alkylene oxides with 2 to 14 carbon atoms or mixtures hereof and (b) allyl and/or methallyl glycidyl ethers to monohydric to quadrihydric aliphatic alcohols with up to 8 carbon atoms, the ratio of component (a) to component (b) being selected so that at least one allyl ether group is linked to the average molecule, reacting the polymer by a known reaction with, based on the allyl ether groups, at least equimolar amounts of a compound of the formula HSO$_3$Y (Y=alkali or ammonium ion) and if necessary, exchanging the cation Y against a hydrogen ion also by a known procedure.

The compounds are suitable as polyol components for the preparation of stable, ionic, aqueous polyurethane dispersions with a high solids content.

7 Claims, No Drawings

POLYOXYALKYLENE ETHER HAVING HYDROXYL AND SULFONATE GROUPS AND THEIR USE IN THE PREPARATION OF DISPERSABLE POLYURETHANES

This is a continuation-in-part of application Ser. No. 07/099,477, filed Sept. 22, 1987, now abandoned.

FIELD OF INVENTION

The invention is directed to novel polyoxyalkylene ethers with an average molecular weight of 400 to 10,000 and having at least one terminal hydroxyl group and at least one lateral —$SO_3X$ group (X=hydrogen, alkali metal or ammonium ion). Considered from another aspect, the invention is directed to the use of these novel polyoxyalkylene ethers as components capable of reacting with isocyanates for the preparation of polyurethanes, which form stable, aqueous dispersions.

BACKGROUND INFORMATION AND PRIOR ART

According to the state of the art, compounds, which have both hydroxyl and sulfonate groups in the molecule, are used to modify polymers, which can be prepared by polyaddition or polycondensation procedures. One possibility of using such compounds is the modification of polyurethanes; by incorporating hydrophilic groups in the polymer, the self-dispersibility of the polyurethanes and the stability of the dispersions obtained are improved significantly. A summary of the chemistry and technology of the preparation of aqueous polyurethane systems by incorporating hydrophilizing modifying agents is presented in the journal, "Die Angewandte Makromolekulare Chemie", Volume 98 (1981), pages 133 to 165.

German Patent No. 2,410,862 discloses such modifying agents, known as ionic chain extenders. They contain ether structures and are dihydroxysulfonates of the general formula $$H-\left[\begin{array}{c}OCH-CH_2\\|\\R\end{array}\right]_n -O-A-\underset{\underset{SO_3X}{|}}{CH}-B-O-\left[\begin{array}{c}CH_2-CH-O\\|\\R\end{array}\right]_n -H$$

wherein
A and B may be the same or different and represent linear or branched alkylene groups with 1-6 carbon atoms, the total number of carbon atoms in A and B being not greater than 7 nor less than 3,
R is hydrogen, $C_1$-$C_4$ alkyl or phenyl,
X is $NH_4$ or an alkali metal and
n is a number from 1 to 30.

The modifying agent thus has only one $SO_3X$ group, which is on the starter alcohol. Other dihydroxysulfonates are described in the German Patent No. 2,437,218. Here also the products have only one sulfonate group.

German Patent No. 3,407,563 is concerned with sulfonated polyoxyalkylene ethers of the formula $$R^1CH_2O-(C_2H_4O-)_n(C_3H_6O-)_mCH_2CHR^3CH_2-SO_3X$$

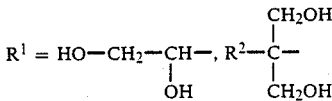

wherein
$R^2=CH_3-$, $C_2H_5-$, $C_3H_7-$, $R^3=H-$ or $CH_3-$, $X=H-$, alkali metal or ammonium ion, n=0 to 100, m=0 to 50, n+m≧1. The compounds are synthesized by the free radical addition of a compound of formula $HSO_3X$ in a known manner in the presence of catalysts and, if necessary, at an elevated temperature to a compound of the formula $R^1CH_2O-(C_2H_4O-)_n(C_3H_6O-)_mCH_2CR^3=CH_2$.

These compounds may be used as the sole or as shared polyol components for the preparation of curable adhesives on polyurethane basis and bring about an increase in the combined tension and shear resistance and in the roller peel strength of the adhesive bonds.

OBJECTS OF THE INVENTION

It is the primary object of the present invention to provide modifying agents, which are especially suitable for the introduction of hydrophilic regions in polyurethanes. In particular, the modifying agents should have a plurality of ionic groups, which may lead to the development of physical cross linking in the nature of ionomers. Another object is to synthesize the modifying agents simply and from readily accessible raw materials.

It is also an object of the invention to provide a procedure for forming stable, aqueous polyurethane dispersions.

SUMMARY OF THE INVENTION

The novel polyoxyalkylene ethers having a particular structure fulfill these requirements in a superior and surprising manner. The inventive polyoxyalkylene ethers have an average molecular weight of 400 to 10,000 and at least one terminal hydroxyl group as well as at least one lateral —$SO_3X$ group (X=hydrogen, alkali metal or ammonium ion), and are obtainable by (1) the statistical or blockwise addition of (a) α-alkylene oxides with 2 to 14 carbon atoms or mixtures hereof and (b) allyl and/or methallyl glycidyl ethers to monohydric to quadrihydric aliphatic alcohols with up to 8 carbon atoms, the ratio of component (a) to component (b) being selected so that at least one allyl ether group is linked to the average molecule, (2) reacting the polymer thus obtained in known manner with, based on the allyl ether groups, at least equimolar amounts of a compound of the formula $HSO_3Y$ (Y=alkali metal or ammonium ion) and, (3) if desired, exchanging the cation Y for a hydrogen ion, also by a known procedure.

The new polyoxyalkylene ethers of the invention should preferably have 2 to 6 lateral —$SO_3X$ groups in the average molecule.

The inventive polyoxyalkylene ethers may be obtained by first adding on components (a) and (b) to a starter alcohol. Monohydric to quadrihydric alcohols with up to 8 carbon atoms serve as starter alcohol. The functionality of the starter alcohol determines the functionality of the polyoxyalkylene ether. Since the hydrophilizing polyol components in the preparation of polyurethanes generally are chain extension agents, dihydric aliphatic alcohols are especially preferred as starter alcohols. Particularly preferred are dihydric alcohols with 2 to 8 carbon atoms. If the polyoxyalkylene ethers of the invention are to have only one terminal hydroxyl group, monohydric aliphatic alcohols with 1 to 8 carbon atoms may be used as starter alcohols. A preferred example of a trihydric alcohol is glycerin or 1,2,6-hexanetriol. Especially pentaerythritol comes into consideration as quadrihydric aliphatic alcohol. The term "aliphatic alcohols" is understood to include also those alcohols, the carbon chain of which is interrupted by an oxygen atom, for example, alkyl ethylene glycols such as butyl ethylene glycol.

Ethylene oxide and propylene oxide come particularly into consideration as $\alpha$-alkylene oxides. However, higher molecular weight $\alpha$-alkylene oxides with up to 14 carbon atoms, such as butylene oxide, octene-1-oxide, decene-1-oxide, dodecene-1-oxide or tetradecene-1-oxide may also be used. The individual alkylene oxides may be used by themselves or in mixtures with other alkylene oxides. Especially preferred are polyoxyalkylene ethers, which are formed exclusively by the addition reaction of ethylene oxide and/or propylene oxide.

The $\alpha$-alkylene oxides (component (a)) and the allyl and/or methallyl glycidyl ethers (component (b)) are added on randomly (statistically) or blockwise to the starter alcohols. For the random addition, the aliphatic alcohol is allowed to react with the mixture of $\alpha$-alkylene oxides and allyl or methallyl glycidyl ethers. For the blockwise addition, the components (a) and (b) are added in each case separately in one or several steps. For example, it is possible to add on first ethylene oxide, then allyl glycidyl ether and once again ethylene oxide to the starter alcohol. Of course, it is also feasible first to add on the allyl glycidyl ether to the starter alcohol, followed by the alkylene oxide. If the addition reaction is carried out in separate steps, block copolymers are obtained, which have a plurality of alkylene oxide blocks and allyl or methallyl glycidyl ether units.

The addition reaction of components (a) and (b) to the starter alcohol is carried out in known manner, advantageously at temperatures of 60° to 130° C., preferably in a closed reactor and in the presence of catalysts. Suitable catalysts for the addition reaction are alkali metal hydroxides and alkali metal alcoholates.

The addition product obtained is then reacted, also by a known procedure with compounds of the formula $HSO_3Y$. Y is an alkali metal or ammonium ion. The addition reaction is described, for example, in Houben-Weyl "Methoden der Organischen Chemie" (Methods of Organic Chemistry), volume IX, page 380. Preferably, sodium hydrogen sulfite or sodium pyrosulfite is used. The hydrogen sulfite or pyrosulfite is used in an amount at least equimolar with the allyl ether groups. Preferably, an up to five-fold excess of the sulfite is used. The free radical addition reaction proceeds in high yield in the presence of the oxygen of the air at moderately raised temperatures up to 100° C. The reaction is carried out at a pH from 4 to 10 and preferably from 7 to 8.5. If compounds are desired, in which X is a hydrogen ion, such compounds are obtained easily by exchanging the cation Y for a hydrogen ion using an ion exchange resin.

It will be clear to those skilled in the art that the reaction may also be carried out with other metal hydrogen sulfites, such as alkaline earth hydrogen sulfites. However, these compounds are generally not used because of their lower solubility.

Examples of the inventive polyoxyalkylene ethers are given in the following formulas, in which
EO represents units of the formula $C_2H_4O$ and
PO represents units of the formula $C_3H_6O$:

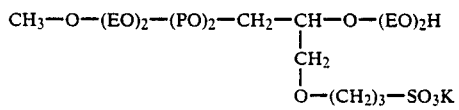

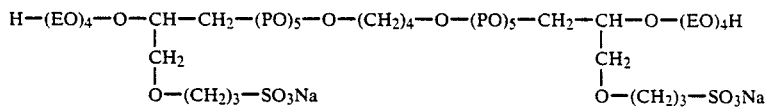

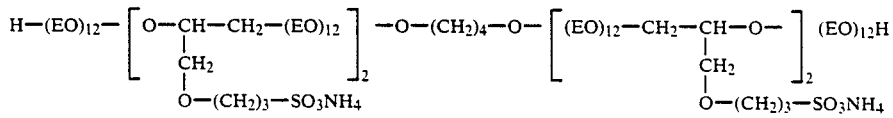

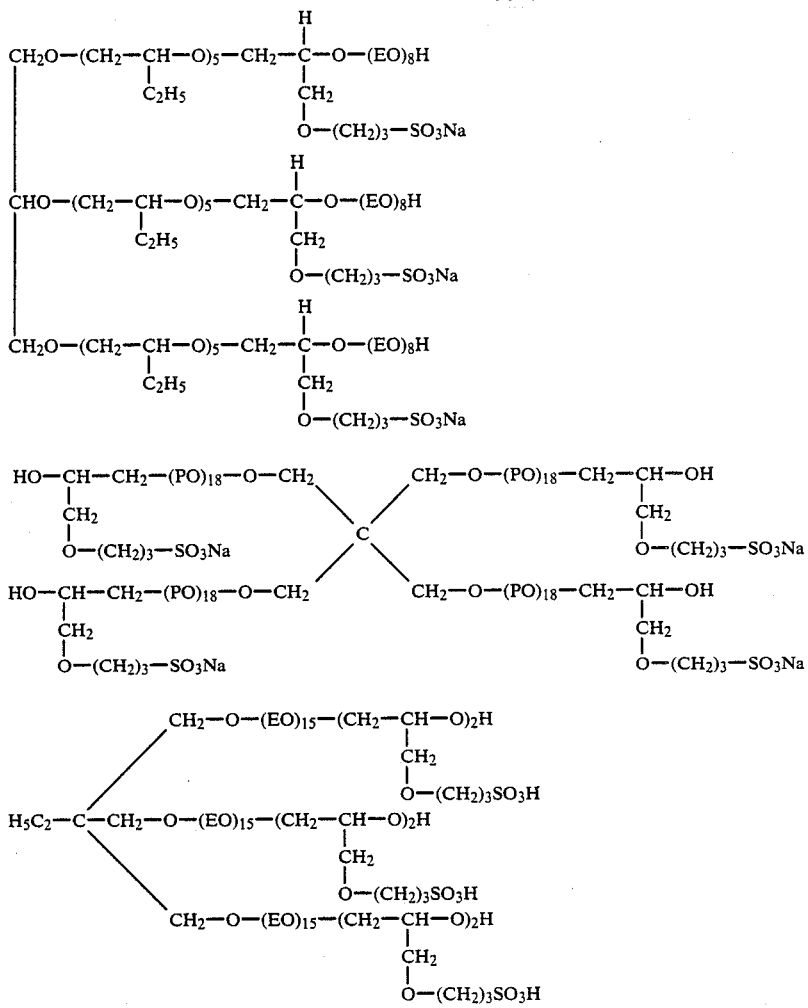

The inventive polyoxyalkylene ethers are distinguished by virtue of the fact that they have one or more lateral —SO₃X groups. The number of —SO₃X groups is specified in a simple manner within the average molecular weight aimed for by the proportion of component (b) in the addition reaction of components (a) and (b) to the aliphatic alcohol. Since the addition reaction can be carried out in blockwise fashion, the —SO₃X groups may be disposed in a specified manner in the average molecule.

The hydrophilicity of the modifying agent is additionally affected by the choice of component (a). If ethylene oxide is used exclusively as alkylene oxide in the addition reaction, products of high hydrophilicity are obtained. This hydrophilicity is reduced, more or less, when some or all of the alkylene oxides used have a longer-chain. By the block-wise addition of different alkylene oxides, it is furthermore possible to prepare products, which have certain surfactant properties. For example, it is possible to add on propylene oxide, then allyl glycidyl ether and finally ethylene oxide to the aliphatic alcohol serving as starter alcohol. After its reaction with compounds of the formula HSO₃Y, such a product shows pronounced surface-active properties.

A further aspect of the invention is the use of the inventive compounds as components with hydroxyl groups which are capable of reacting with isocyanates for the preparation of polyurethanes that form stable aqueous dispersions.

Especially preferred for this purpose is the use of compounds, which are derived from a dihydric aliphatic alcohol and have two or more lateral —SO₃X groups. The use of the inventive modifying agents, renders it possible to prepare polyurethanes with a larger number of ionic groups, which are not separated from one another by the urethane or urea groups forming the so-called hard phase. This leads to improved dispersibility of the modified polyurethanes. When using the inventive compounds to moddify polyurethanes, it is especially possible to prepare dispersions with a high solids content, for example, dispersions with a solids content of up to 60% by weight, based on the dispersions. The dispersions obtained are very stable and exhibit excellent stability towards electrolytes and at temperatures below the freezing point.

The inventive compounds may, however, also be used to modify polymers, for example, to prepare hydrophilized polyesters. Such polyesters can be dyed readily. Due to the incorporation of the inventive compounds, the surface conductivity of the polymers is increased. This is particularly advantageous in applications in which the electrostatic charge can lead to interfering effects.

Polyoxyethylene ethers with two or more lateral —SO$_3$X groups have a thickening effect on aqueous solutions. They may be used as complexing agents in electrolytes, for example, in the electroplating industry.

The preparation and properties of the inventive polyoxyalkylene ethers are explained in greater detail in the following examples, it being understood that the examples are given by way of illustration and not by way of limitation.

EXAMPLE 1

(A) Preparation of a Block Copolymer from Ethylene Oxide, Propylene Oxide and Allyl Glycidyl Ether 1,4-Butanediol (90 g, 1 mole) and 5.6 g (0.1 moles) of potassium hydroxide are heated to 110° C. in a reactor, which has been flushed carefully with pure nitrogen. A mixture of 80 g (1.82 moles) of ethylene oxide and 80 g (1.38 moles) of propylene oxide is then added quickly at such a rate, that the interior of the reactor does not exceed a temperature of 120° C. and a pressure of 6 bar. The reaction mixture is maintained at 115° C., until its epoxy content approaches zero. Allyl glycidyl ether (228 g, 2 moles) is then added at 115° C. to 120° C. and, when the addition reaction is finished, a mixture of 221 g (5.02 moles) of ethylene oxide and 221 g (3.81 moles) of propylene oxide is once more added. The temperature is maintained at 115° to 120° C., until the decreasing pressure in the reactor indicates the end of the reaction. Slight amounts of unreacted monomers are removed under a vacuum at 80° to 90° C. The product obtained is neutralized with dilute phosphoric acid, the water is removed by distillation and the potassium phosphate formed by filtration with a filter aid. The hydroxyl number of the product is 126; assuming a functionality of 2, this corresponds to a molecular weight of 890. The iodine number is 56.1, compared to the theoretical iodine number of 56.4.

(B) Preparation of the $\alpha,\omega$-Dihydroxypolyether Disulfonate

The polyether (890 g, 1 mole), obtained in 1(A), is mixed in a reactor with 1,500 g of water, 650 g of ethanol and 0.5 g of manganese acetate and adjusted to a pH of 8.1 with 30% by weight sodium hydroxide solution. A solution of 228 g (1.2 moles) of sodium pyrosulfite in 760 g of water is added at a temperature of 25° C. over a period of 4 hours. At the same time, finely divided air is passed into the mixture in amounts of 10 L per hour and the pH is maintained between 7.5 to 8.5 by several additions of 30% by weight sodium hydroxide solution. The mixture is allowed to react out for 2 hours and is then neutralized with dilute phosphoric acid, after which the solvent is removed by distillation. After addition of 800 g of ethanol, the solids are removed by filtration and the ethanol is distilled off. The product obtained, which is referred to as polyether sulfonate I, has the following characteristic data:
hydroxyl number: 100;
iodine number: 0.6;
sulfur content: 5.3% by weight;
acid number: 0.5;
molecular weight: 1120 (calculated from the hydroxyl number).

EXAMPLE 2

(A) Preparation of a Block Copolymer from Ethylene Oxide, Propylene Oxide and Allyl Glycidyl Ether As described in Example 1(A), at first a mixture of 205 g (4.66 moles) of ethylene oxide and 205 g (3.53 moles) of propylene oxide, then 228 g (2 moles) of allyl glycidyl ether and subsequently a mixture of 796 g (18.1 moles) of ethylene oxide and 796 g (13.7 moles) propylene oxide are added on blockwise at 115° to 120° C. to 90 g (1 mole) of 1,4-butanediol, to which 5.6 g (0.1 moles) of potassium hydroxide have been added. After the removal of slight residual amounts of monomers under vacuum at 80° to 90° C., the product is neutralized with dilute phosphoric acid and the water is removed by distillation and the potassium phosphate by filtration using a filter aid. The hydroxyl number of the polyether is 50.5; assuming a functionality of 2, this corresponds to a molecular weight of 2222. The iodine number is 23.0, compared to the theoretical iodine number of 23.1.

(B) Preparation of the $\alpha,\omega$-Dihydroxypolyether Disulfonate

The polyether (1,110 g (0.5 moles), prepared in 2(A), is mixed with 1,800 g of water, 760 g of ethanol and 0.56 g of manganese acetate and adjusted to a pH of 8.1 with 30% by weight sodium hydroxide solution. A solution of 114 g (0.6 moles) of sodium pyrosulfite in 380 g of water is added over a period of 3 hours at a temperature of 25° C. At the same time, finely divided air is introduced in amounts of 10 L per hour and the pH is maintained between 7.5 and 8.5 by several additions of 30% by weight sodium hydroxide solution. The mixture is allowed to react out for 3 hours and then neutralized with dilute phosphoric acid, whereupon the polyether sulfonate is worked up as in 1(B). The product obtained, which is referred to as polyether sulfonate II, has the following characteristic data:
hydroxyl number: 46;
iodine number: 0.7;
sulfur content: 2.5% by weight;
acid number: 0.5;
molecular weight: 2440 (calculated from the hydroxyl number).

EXAMPLE 3

(A) Preparation of a Block Copolymer from Ethylene Oxide, Propylene Oxide and Allyl Glycidyl Ether As described in Example 1(A), at first 228 g (2 moles) of allyl glycidyl ether, then a mixture of 400 g (9.09 moles) ethylene oxide and 400 g (6.90 moles) of propylene oxide, thereafter 228 g (2 moles) of allyl glycidyl ether and finally a mixture of 360 g (8.18 moles) of ethylene oxide and 360 g (6.21 moles) propylene oxide are added on blockwise at 115° to 120° C. to 90 g (1 mole) of 1,4-butanediol, to which 5.6 g (0.1 moles) of potassium hydroxide have been added. After slight residual amounts of monomers are removed under vacuum at 80° to 90° C., the product is neutralized with dilute phosphoric acid and the water is removed by distillation and the potassium phosphate formed by filtration using a filter aid.

The hydroxyl number of the polyether is 56.8; assuming a functionality of 2, this corresponds to a molecular weight of 1975. The iodine number is 49.4, compared to the theoretical iodine number of 50.6.

(B) Preparation of the α,ω-Dihydroxypolyether Sulfonate

Preparation of the α,ω-Dihydroxypolyether Tetrasulfonate

The polyether (988 g, 0.5 moles) obtained in 3(A), is mixed with 1,600 g of water, 700 g of ethanol and 0.5 g of manganese acetate and adjusted to a pH of 8.1 with 30% by weight sodium hydroxide solution. A solution of 228 g (1.2 moles) of sodium pyroslfite in 760 g of water is added over a period of 4.5 hours at 25° C., finely divided air being introduced at the same time in amounts of 10 L per hour and the pH being maintained at 7.5 to 8.5 by several additions of 30% by weight sodium hydroxide solution. The mixture is allowed to react out for 3 hours and is then neutralized with dilute phosphoric acid, whereupon the polyether sulfonate is worked up as in Example 1(B). The product obtained, which is referred to as polyether sulfonate III, has the following characteristic data:
 hydroxyl number: 46.8;
 iodine number: 0.9;
 sulfur content: 5.15% by weight;
 acid number: 0.7;
 molecular weight: 2400 (calculated from the hydroxyl number).

EXAMPLE 4

(A) Preparation of a Random (Statistical) Copolymer from Ethylene Oxide, Propylene Oxide and Allyl Glycidyl Ether 1,4-Butanediol (90 g, 1 mole) and 5.6 g (0.1 moles) of potassium hydroxide are heated to 110° C. in a reactor, which has been carefully flushed with pure nitrogen. A mixture of 361 g (8.20 moles) of ethylene oxide, 361 g (6.22 moles) of propylene oxide and 228 g (2 moles) of allyl glycidyl ether is then added quickly at such a rate, that the the interior of the reactor does not exceed a temperature of 120° C. and a pressure of 6 bar. The reaction mixture is maintained at 115° C., until the pressure drops and the epoxy content approaches zero. Slight amounts of unreacted monomers are removed under vacuum at 80° to 90° C. and the product is worked up as described in Example 1(A).

The hydroxyl number of the product is 114; assuming a functionality of 2, this corresponds to a molecular weight of 984. The iodine number is 51.1, compared to a theoretical iodine number of 50.8.

(B) Preparation of the α,ω-Dihydroxypolyether Disulfonate

The polyether (984 g, 1 mole), obtained in 4(A), is mixed with 1,600 g of water, 700 g of ethanol and 0.5 g of manganese acetate and adjusted to a pH of 8.1 with 30% by weight sodium hydroxide solution. A solution of 228 g (1.2 moles) of sodium pyrosulfite in 760 g of water is added over a period of 4 hours at 25° C. At the same time, finely divided air is introduced in amounts of 10 L per hour and the pH is maintained between 7.5 and 8.5 by several additions of 30% by weight sodium hydroxide solution. The mixture is allowed to react out for 2 hours. It is then neutralized with dilute phosphoric acid, whereupon the polyether sulfonate is worked up as in Example 1(B). The product obtained, which is referred to as polyether sulfonate IV, has the following characteristic data:
 hydroxyl number: 93.8;
 iodine number: 0.7;
 sulfur content: 5.1% by weight;
 acid number: 0.3;
 molecular weight: 1196 (calculated from the hydroxyl number).

EXAMPLE 5

(A) Preparation of a Random Copolymer from Ethylene Oxide and Allyl Glycidyl Ether 1,4-Butanediol (90 g, 1 mole) and 5.6 g (0.1 moles) of potassium hydroxide are heated to 110° C. in a reactor, which has been flushed carefully with pure nitrogen. A mixture of 228 g (2 moles) of allyl glycidyl ether and 792 g (18.0 moles) of ethylene oxide is then added quickly at such a rate, that the interior of the reactor does not exceed a temperature of 120° C. and a pressure of 6 bar. The procedure of Example 4(A) is then followed. A polyether with a hydroxyl number of 106 is obtained; assuming a functionality of 2, this corresponds to a molecular weight of 1058. The iodine number is 48.8, compared to the theoretical iodine number of 49.3.

(B) Preparation of the α,ω-Dihydroxypolyether Disulfonate

The polyether (1058 g, 1 mole), obtained in 5(A), is mixed with 1,700 g of water, 750 g of ethanol and 0.54 g of manganese acetate and adjusted to a pH of 8.1 with 30% by weight sodium hydroxide solution. A solution of 228 g (1.2 moles) of sodium pyrosulfite in 760 g of water is added over a period of 4 hours at 25° C. At the same time, finely divided air is introduced in amounts of 10 L per hour and the pH is maintained between 7.5 and 8.5 by several additions of 30% by weight of sodium hydroxide solution. The mixture is allowed to react out for 2 hours and is then worked up as described in Example 1(B). The product obtained, which is referred to as polyether sulfonate V, has the following characteristic data:
 hydroxyl number: 93;
 iodine number: 0.9;
 sulfur content: 5.0% by weight;
 acid number: 0.6;
 molecular weight: 1206 (calculated from the hydroxyl number).

EXAMPLE 6

Preparation of a Polyurethane Dispersion

A mixture of 118.5 g (0.06 moles) of a commercially available polyesterdiol from adipic acid, 1,6-hexanediol and neopentyl glycol (hydroxyl number: 56.8) and 11.2 g (0.01 moles) of the polyether sulfonate I of the invention is freed from residual amounts of water under vacuum at 120° C. and then, at 85° C., mixed with 22.2 g (0.1 moles) of isophorone diisocyanate. The reaction mixture is allowed to react at this temperature until a constant isocyanate content of 1.6% by weight is reached. The polymer is diluted with 100 g of anhydrous acetone and a solution of 1.5 g (0.025 moles) of ethylenediamine in 50 g of acetone is slowly added dropwise at 60° C. The reaction mixture is kept at this temperature until the isocyanate content has dropped below 0.2% by weight. It is then cooled to 30° C. and 124 g of deionized water are added slowly with effective stirring to form the polyurethane dispersion. After the acetone is removed under vacuum, a finely dispersed polyurethane dispersion with a solids content of 55% by weight is obtained. The properties of this dispersion are listed in Table 1.

EXAMPLES 7 to 10

Preparation of Further Polyurethane Dispersions

Polyurethane dispersions with solids contents greater than 50% by weight are prepared as described in Example 6 from 0.06 moles of polyesterdiol from adipic acid, 1,6-hexanediol and neopentyl glycol (hydroxyl number: 56.8)
0.01 moles of the polyether sulfonates II to V of the invention
0.10 moles of isophorone diisocyanate
0.025 moles of ethylenediamine
approx. 150 g of acetone
approx. 120–135 g of deionized water.

The amounts of polyether sulfonate are calculated on the basis of the hydroxyl numbers that were determined or of the molecular weights that were calculated from these hydroxyl numbers.

The properties of the polyurethane dispersions are listed in Table 1.

For comparison, the propoxylated adduct from 2-butene-1,4-diol and sodium hydrogen sulfite (molecular weight: 412), described in Example 5 of the German Patent No. 2,410,862, and the sulfonated polyoxyalkylene ether (molecular weight; approx. 1110), described in Example 1 of the German Patent No. 3,407,563, are used instead of the polyether sulfonates of the invention for the preparation of polyurethane dispersions, the molar amounts of polyether sulfonate being doubled and the molar amounts of polyester diol being reduced correspondingly.

The comparison shows that polyurethane dispersions, which are less stable in the presence of electrolytes and/or at low temperatures, are obtained with these products.

EXAMPLE 11

Preparation of a Polyurethane Dispersion Without the Use of Solvents

A mixture of 50.0 g (0.025 moles) of a polyesterdiol from adipic acid, 1,6-hexanediol and neopentyl glycol (molecular weight: 2,000) and 19.5 g (0.016 moles) of polyether sulfonate IV is dehydrated at 120° C. under vacuum and 9.7 g (0.058 moles) of 1,6-hexamethylenediisocyanate are added to it at 70° C. The reaction mixture is heated to 80° C. until an NCO content of about 1.8% is reached. Subsequently, 125 g of deionized water are added slowly at 80° C. with effective stirring. After about 5 minutes, a solution of 0.9 g (0.015 moles) of ethylenediamine and 22 g of deionized water are added and stirring is continued for approximately a further 30 minutes.

A stable, finely dispersed polyurethane dispersion with a solids content of 35% by weight and a viscosity of 3,000 mPas is obtained. After evaporation of the water, the dispersion forms a clear, elastic film.

TABLE 1

| Example | Polyether Sulfonate | Solids Content (wt. %) | Viscosity[1] at 25° C. (mPas) | Electrolyte[2] Stability | Freeze[3] Test |
| --- | --- | --- | --- | --- | --- |
| (a) Of the Invention | | | | | |
| 6 | I | 55 | 700 | O.K. | O.K. |
| 7 | II | 57 | 3000 | O.K. | Viscosity increase after 3 cycles |
| 8 | III | 56 | 160 | O.K. | O.K. |
| 9 | IV | 55 | 100 | O.K. | O.K. |
| 10 | V | 56 | 200 | O.K. | Viscosity increase after 3 cycles |
| (b) Comparison | | | | | |
| Example 5 of German Patent 2,410,862 | | 48 | 20 (sediment after 2 weeks) | Precipitation after 5 mL NaCl solution | Solid after 1 cycle |
| Example 1 of German Patent 3,407,563 | | 50 | 600 | O.K. | Solid after 2 cycles |

[1]Measured with the rotating viscometer according to DIN 125
[2]To 80 mL of dispersion, at most 80 mL of 10% by weight of aqueous sodium chloride solution is added dropwise and the dispersion is judged for changes.
[3]The dispersion (10 mL) is kept for 3 hours at −18° C. and then for 21 hours at room temperature. This cycle is repeated three times and the dispersion is judged for changes.

We claim:

1. Polyoxyalkylene ether with an average molecular weight of 400 to 10,000 and having at least two terminal hydroxyl groups and at least one —SO$_3$X group wherein X is hydrogen, alkali metal or ammonium ion, said polyoxyalkylene ether being the reaction product obtained by
   (i) the statistical or blockwise addition of
      (a) α-alkylene oxides with 2 to 14 carbon atoms or mixtures hereof, and
      (b) allyl and/or methallyl glycidyl ethers,
      to dihydric to quadrihydric aliphatic alcohols with up to 8 carbon atoms, the ratio of component (a) to component (b) being selected so that at least one allyl ether group is linked to the average molecule, and
   (ii) reacting the polymer thus obtained with, based on the allyl ether groups, at least equimolar amounts of a compound of the formula HSO$_3$Y, wherein Y is alkali metal or ammonium ion.

2. The polyoxyalkylene ether of claim 1, wherein the cation Y is exchanged against a hydrogen ion by ion exchange.

3. The polyoxyalkylene ether of claims 1 or 2, wherein its average molecular weight is 500 to 3000.

4. The polyoxyalkylene ether of claims 1 or 2, having 2 to 6 lateral —SO$_3$X groups.

5. The polyoxyalkylene ether of claims 1 or 2, wherein the alkylene oxides are present in the form of blocks.

6. The polyoxyalkylene ether of claims 1 or 2, wherein the alkylene oxides are ethylene oxide and/or propylene oxide.

7. The polyoxyalkylene ether of claims 1 or 2, wherein the terminal hydroxyl groups are primary hydroxyl groups.

* * * * *

UNITED STATES PATENT AND TRADEMARK OFFICE
CERTIFICATE OF CORRECTION

PATENT NO. : 4,927,961

DATED : May 22, 1990

INVENTOR(S) : Jurgen Fock et al

It is certified that error appears in the above-identified patent and that said Letters Patent is hereby corrected as shown below:

In the heading of the patent, it should read:

[54] POLYOXYALKYLENE ETHERS HAVING HYDROXYL AND SULFONATE GROUPS AND THEIR USE IN THE PREPARATION OF DISPERSIBLE POLYURETHANES

Signed and Sealed this

Twenty-ninth Day of October, 1991

Attest:

HARRY F. MANBECK, JR.

Attesting Officer

Commissioner of Patents and Trademarks